UNITED STATES PATENT OFFICE 2,394,527

COLOR PHOTOGRAPHY

David W. Woodward, Wilmington, Del., assignor to E. I. du Pont de Nemours & Company, Wilmington, Del., a corporation of Delaware No Drawing. Application November 4, 1942, Serial No. 464,533

4 Claims. (Cl. 95—6)

This invention pertains to processes of color photography and compositions and elements thereof utilizing novel basic 2-substituted 1-amino-5- and 1-amino-8-naphthol dye-intermediates. More particularly it relates to processes of color photography embodying color forming development steps and to processes of color photography embodying color coupling development and azo coupling steps. Still more particularly it relates to color-yielding elements having colloid layers containing such basic 2-substituted-aminonaphthols.

It is an object of the present invention to provide an improvement in the process of producing photographic color pictures. A further object resides in the provision of a new and improved class of dyestuff components, color formers, or coupling compounds. A still further object is to provide a colloid emulsion or dispersion for color coupling development, or azo coupling having incorporated therein compounds from the new class of basic 2-substituted-aminonaphthols.

Another object is to provide new photographic elements which can be used in processes of color photography involving chromogenic development and azo coupling steps which contain novel immobile dyestuff ingredients. Still further objects are to provide methods of preparing the aforesaid types of immobile dye-intermediates, color formers, or coupling compounds capable of being converted to dyes to produce colored fabrics, materials, or photographs. Still other objects will be apparent from the following description of the invention.

The dye intermediates, color formers, or coupling components utilized in accordance with this invention are basic 1-amino-5-naphthols and 1-amino-8-naphthols which have in the 2-positions thereof, i. e., ortho to the amino group, an atom or group which by preventing ortho coupling directs azo dye coupling para to the amino group when coupling is effected in a solution whose pH is less than 7. These basic amino-naphthol dye intermediates are preferably of molecular weight greater than 300 to render them immobile or fast to diffusion in colloid layers of photographic film elements. They have in the 2-position a group which will prevent azo coupling in this position which is ortho to the amino group. Therefore, these intermediates yield more saturated and deeper shades of blue and blue-green. Suitable substituent groups in the 2-position are typified by hydrocarbon and hydrocarbon radicals containing an ether linkage.

In the arts of dye chemistry and color photography, the union or coupling of diazonium compounds or the oxidation products of photographic primary aromatic amino developing agents with color formers, dye intermediates, or coupling components produces dyes. The color formers, dye intermediates, or coupling components of this invention comprise a narrow class of basic 1-amino-5 and 1-amino-8-naphthols which have in the 2-position thereof an atom or group which prevents ortho coupling. They include primary, secondary, and tertiary aminonaphthols in which reactive positions are available para to the basic amino group. Where substituents are present on the nitrogen, they are linked thereto by a methylene ($CH_2$) group. It is emphasized that these 1-amino groups are basic as distinguished by their ability to form salts in dilute (1N) hydrochloric acid. Similar compounds which are non-basic, i. e., incapable of such salt formation, and contain an amide group in the 1-position are not within the scope of this invention since the amide group does not direct coupling and although 1-acetamino-5-naphthols are azo coupling components, they do not couple with diazonium compounds in a solution of pH less than 7 and the azo group does not enter the ring containing the amino group under any conditions. Blue or blue-green azo dyes of this type cannot be produced except with a basic amino group and such compounds containing a non-basic amino group are not a part of this invention.

When azo dyes are produced by coupling diazotized p-nitroaniline and its derivatives with 1-amino-5 and 8-naphthols in acid solution, i. e., pH 1-7, shades ranging from purple to green are obtained. These have the structural formula represented by:

(A) 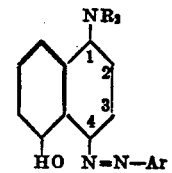

(B) 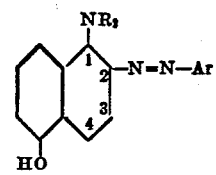

R is hydrogen, alkyl, or substituted alkyl and Ar is aromatic. Coupling occurs in either the 2- or the 4-position and the actual dye obtained is usually a mixture of the two isomeric monoazo dyes. The para dye (A) is slightly more saturated and deeper in color, that is, greener, than the ortho dye (B), and hence the para type (A) is spectrally more desirable for use as the blue-green azo dye in three-color photography than is the ortho dye (B). To secure the para (A) type dye exclusively, it is necessary to introduce a blocking group into the 2-position to prevent ortho coupling. It has been found that the p-aminoazo dyes of this invention are especially useful in the process of Woodward U. S. Serial No. 335,416, filed May 13, 1940 now U. S. P. 2,297,732, and Serial No. 450,403, filed July 10, 1942, since there are few dye intermediates known which form both quinone-imine dyes on chromogenic development and blue-green mono azo dyes on azo coupling as is required in the processes of these applications.

The most important products of this invention are represented by the following formula:

(1)

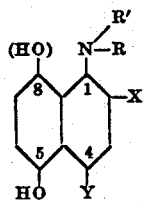

wherein R and R' may be the same or different and are hydrogen, alkyl, or substituted alkyl. X, the group which blocks ortho coupling, is a member of the group consisting of hydrocarbon radicals including alkyl, aryl, aralkyl, and hydrocarbon radicals connected by or containing an ether linkage. R and R', for example, may be alkyl, e. g., methyl, ethyl, dodecyl, cycloalkyl, e. g., cyclohexyl, aralkyl, e. g., benzyl. These radicals may further contain other groups such as halogen, ether, thioether, amide, or sulfone groups. Desirably R contains more than 5 carbon atoms or is a recurring unit of a polymeric chain, for example, a polymeric carboxylic acid connected through an amide group which is, in turn, linked to the nitrogen of the amino-naphthol through a methylene (—CH₂—) group as in Examples I and II. Also, R and X may be part of a heterocyclic ring system. Further, the OH group may be in the 8-position. In all of these compounds the 4-position must necessarily be available for coupling; that is, Y is hydrogen or some readily replaceable radical such as a free sulfonic acid or carboxylic acid group or halogen atom. In the preferred embodiment of this invention these compounds have a molecular weight in excess of 300 and as such are, during processing, fast to diffusion or immobile in gelatin layers or other colloidal binding layers used in preparing photographic elements.

The preferred products of this invention, in addition, contain carboxylic or sulfonic acid groups either on the substituent R, R', or X, or more preferably on the naphthylamino nucleus. Such groups cause the intermediate to be soluble in aqueous solutions and readily compatible with gelatin or photographic emulsions containing gelatin or other binding agents. Such compatibility yields haze-free films which are convertible to clear bright colors. Thus, the preferred products all give clear colloidal dispersions or solutions to the extent of at least 1 g. in 100 g. of 2% sodium carbonate solution.

Azo dyes produced from these derivatives range in color from blue through blue-green to green, and may have the following general type of structure:

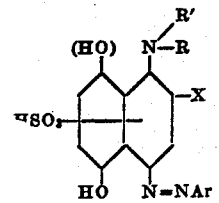

Ar is an aromatic nucleus. The shade of the dye depends on the aromatic amine used to prepare the diazonium compound and on the substituents R, R', and X.

While X in the representative formulae is preferably hydrocarbon or hydrocarbon containing an ether linkage, for example, alkoxyl, other organic radicals which prevent or decrease ortho coupling and which cause only minor changes in the physical and chemical properties of the product are of value in this invention. Compounds where R and R' or R and X are members of a heterocyclic ring are also included providing, of course, that the nitrogen atom in the 1-position remains basic.

A number of methods for preparing the immobile products of this invention are possible. The easiest and a preferred method consists in introducing a substituted alkyl group into a low molecular weight compound, such as, for example, 1-amino-2-methyl-5-naphthol or its 6-sulfonic acid. This is easily prepared by the usual method starting with beta-methylnaphthalene in place of naphthalene. Thus the hydrocarbon is nitrated to the 1-nitro-2-methylnaphthalene, which in turn is sulfonated, the 1,5-isomer separated and fused with caustic soda to give the desired amino-naphthol. This may in turn be further sulfonated in the 6-position. In application Serial No. 395,496, filed May 27, 1941, and Serial No. 450,146, filed July 8, 1942, is described in detail a method which involves introduction of an amine-containing substituent into the aromatic nitrogen atom through a methylene group and subsequent acylation of the external amino group with a high molecular weight organic acid, polymeric acid, or a polyacid or derivative thereof, including the acid, halide, ester, etc. Thus, derivatives of stearic acid, phthalic acid, octadecyl sulfonic acid, polyacrylic acid, or polymerizates of maleic anhydride with vinyl compounds may be employed. The above mentioned applications contain a complete description of this method of immobilization and many other acids that may be used in preparing the acid amides in accordance with this invention.

Another method of increasing the molecular weight to render the compounds immobile is, in the case where at least one of the R's of the formula (I) is hydrogen, by direct alkylation of the amine group with a high molecular weight alkyl or substituted alkyl chloride or bromide of 8-18 carbon atoms. Further, an aliphatic halo acid or acetal, e. g., chloroacetic acid or chloropropionaldehyde diethyl acetal, may be condensed in the same way to form (1) a naphthylamino acid which can be in turn converted to an external amide by reaction with a high molecular weight amine or (2) an acetal which may be converted by acetal interchange into a polyvinyl acetal by the method of application Serial No. 233,480, filed October 5, 1938, by Dorough and McQueen, now in U. S. P. 2,310,943.

A further alternative is to convert a 1-acetamino-2-substituted-5-naphtholacetate-6-sulfonic acid with chlorosulfonic acid or phosphorus pentachloride into the sulfonyl chloride which is then condensed with a high molecular weight or polyfunctional amine to form the sulfonamide, following which the acetate groups are hydrolyzed. Alternatively, a 1-nitro-2-substituted-5 or 8-naphtholacetate, 3-, 6-, or 7-carboxylic acid, or 1-nitro-2-carboxy-5 or 8-naphthol acetate may be treated with phosphorus pentachloride to form the acid chloride which is then converted to an amide by reaction with a high molecular weight or polyamine. Such amines include octylamine, octadecylamine, cyclohexylamine, or aminocellulose. Following such amide formation, the nitro group is reduced to form the alpha-naphthylamine containing a 2, 3, 6, or 7-carbonamide group. The alpha-amino group may be alkylated if desired.

Compounds suitable for use in preparing the immobile color formers, dye intermediates, or coupling components of this invention are quite numerous in the literature. A list of representative compounds that may be prepared for use in accordance with the teachings of this invention or by themselves or by increasing their molecular weight by the introduction of high molecular weight organic radicals and salt forming groups are contained in the following table:

| Name | Structure |
|---|---|
| 1,2-dihydro-5-(or -8-)hydroxy-beta-naphthoxazole. | |
| 1,2-dihydro-7-(or -10-)hydroxy-4-naphth-(1,2-d)-m-oxazine. | |
| 1,2,3,4,8,9,10,11-octahydro-7-(or -12-)hydroxy-7,8-beta-naphthoquinoline. | |
| 2,3-dihydro-7-(or -10-)hydroxy-4,1-alpha-naphthisoxazine. | |
| 2,3-dihydro-6-(or -9-)hydroxy-alpha-naphthazole. | |
| 4-(or -1-)hydroxy-7,8,9,10-tetrahydrobenzo(g)cyclopent(b)-indole. | |
| 1,2,3,4-tetrahydro-7-(or -10-)hydroxy-7,8-benzoquinazoline. | |
| 1,2,3,4-tetrahydro-7,8-benzo-quinoline-3,7-(or -10-)diol. | |
| 1,2-dihydro-5-(or -8-)hydroxy-beta-naphthothiazole | |

The methods used for immobilizing dye intermediates having similar groups which have been described in the chemical literature are applicable to the compounds of this invention. The procedures of U. S. Patents 2,166,181, 2,178,612, 2,179,228, 2,179,244, 2,186,719, 2,186,731, 2,186,732, 2,186,849, 2,186,851 and 2,186,852 may be utilized by effecting a reaction with the appropriate groups in the dye intermediates nucleus. In addition, the immobilizing reactions with the reactive compounds of copending applications Ser. Nos. 301,041 filed October 24, 1939, now U. S. P. 2,230,291, and 301,070 filed October 24, 1939, now U. S. P. 2,304,820, can be utilized.

*Example I*

Two hundred fifteen parts of 1,2,3,4-tetrahydro-7,8-benzoquinoline-3,7-diol is dissolved in 500 parts of acetone under an atmosphere of nitrogen and boiled with 150 parts of an ethylene maleic anhydride copolymer for 6 hours. The mixture is stirred slowly into 1000 parts of benzene, the precipitated product extracted with benzene in a continuous extractor for 12 hours, dried and ground to give a light brown sodium carbonate-soluble polymer having the following probable color unit structure:

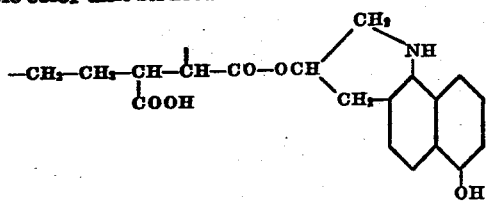

Two parts of this material is dissolved in 15 parts of 4% sodium carbonate and added to 100 parts of 4% gelatin and coated on a subbed cellulose acetate film base. This film when dried can be treated in a solution having a pH of 5 and containing 1 part per 100 of diazotized 4-nitro-2-chloroaniline to give, after washing, a bright clear blue-green. A film similarly treated with diazotized 4-nitroaniline-2-sulfonic acid is also blue-green, while a film treated in like manner with diazotized 2,4-dinitroaniline is found to be green. This intermediate cannot be removed from the gelatin layer by washing. When a light sensitive silver bromide emulsion is coated above this gelatin layer, the film exposed to controlled light, and developed in a p-aminodiethylaniline developer followed by treatment in Farmer's reducer, a bright blue image is obtained. This material may be substituted in equal amount for the blue-green color former of emulsion #1 in Example 1 of the application Serial No. 450,403, filed July 10, 1942, or for one of the blue-green intermediates of application Serial No. 335,416, filed May 15, 1940, now U. S. P. 2,297,732, which applications describe a method of producing natural color photographs in azo dyes.

*Example II*

Reaction of 1-amino-2-methyl-5-naphthol with p-acetaminophenoxyethyl bromide, followed by hydrolysis, sulfonation, and condensation with a styrene-maleic anhydride polymer after the manner described in detail for similar compounds in application Serial No. 450,146, filed July 8, 1942, yields an immobile dye intermediate having the following probable color unit structure:

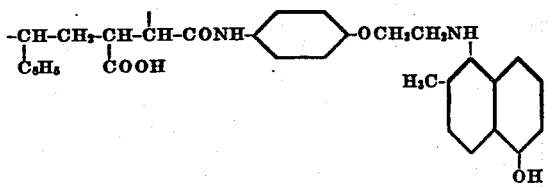

This product has properties similar to the dye intermediate of Example I and may be used in the same way to produce blue quinoneimine dyes or blue-green azo dye images by the azo reversal method described in the application mentioned in Example I above. In comparing the azo dyes formed from this dye intermediate with those formed from the corresponding compound containing hydrogen in the 2-position, it is observed that the dyes from the present intermediate transmit more green, less red, and are slightly brighter, and these are properties which are all desirable to obtain satisfactory color reproduction.

*Example III*

To 100 g. of a gelatino-silver bromide-chloride emulsion containing 10–12% solids by weight is added 25 cc. of an ethyl alcohol solution containing 1 g. of 1,2,3,4,8,9,10,11-octahydro-7-hydroxy-7,8-beta-naphthoquinoline and the resulting emulsion coated on a subbed cellulose acetate film base. The resulting film when exposed and developed in a p-aminodiethylaniline developer yields a film containing a blue image after removal of the silver and silver salts. When this film is processed by the method of application Serial No. 450,403, a blue-green azo dye image is obtained.

*Example IV*

A photographic element bearing an exposed silver bromide-iodide image is developed in a developer of the following composition:

|  | Grams |
|---|---|
| p-Aminodiethylaniline hydrochloride | 3 |
| Sodium carbonate, anhydrous | 25 |
| Sodium sulfite, anhydrous | 2 |
| Water to make 1 liter | |

To which is added just prior to development 250 mg. of 1,2,3,4-tetrahydro-7,8-benzoquinoline-3,7-diol dissolved in 25 cc. of ethyl alcohol. After development the film is washed, bleached, fixed and washed, whereby a blue quinoneimine dye image is formed.

In place of the specific 1-amino-5-naphthols set forth in the specific examples above, may be substituted any of the herein disclosed color formers, dye intermediates, or coupling components which possess the requisite 2-substituents and also have a coupling position para to the amino group. The para position need not be unsubstituted, and in place of the hydrogen atom may be substituted other replaceable groups which act like hydrogen in a coupling reaction e. g. groups such as $SO_3H$, $COOH$, $Cl$, and $Br$.

In the 1-amino-5-(or-8-)naphthols which can be used as dye intermediates or in the preparation of immobile dye intermediates in the photographic compositions, articles, and processes of this invention the 2-position can be occupied by the following representative groups:

Methyl, ethyl, methoxy, ethoxy, phenoxy, ethoxyethyl, carboxyl (and esters thereof), carbonamides, sulfonamides, nitro, chloro, chloromethyl, beta-hydroxyethyl, and the like.

Preferably the 1-amino-naphthol will have a lower (1–4 carbon) alkyl or alkoxy group in the 2-position.

Other groups that are often used in dye intermediate nuclei may also be present; for instance, the presence of halogen, alkoxyl, aryl, amide, sulfone, nitro, etc., groups in many cases is desirable for the effect they have on increasing the brilliance or depth of the color. Sulfonic acid groups are in general desirable in the naphthylamine coupling component nuclei used in this invention as they have the effect of both increasing the brilliance and saturation of the dye and improving its lightfastness.

A large number of aromatic color developing agents containing an unsubstituted amino group may be used to form indamine dyes with the compounds of this invention. Suitable agents are described in U. S. Patents 2,182,815, 2,189,817, 2,191,037, and 2,200,924. Still other suitable color coupling developing agents are those found in U. S. P. 2,163,820 and British Patent 541,649.

The silver salt image can also be developed with aromatic hydrazine developers in like manner to produce azo dye images. Suitable developers are described in U. S. Patent 2,220,924. In addition, a silver halide emulsion containing one of the herein-described intermediates which has been exposed and treated to develop the silver image and fixed can be bleached and treated with a diazo or tetrazo salt and converted into a color image by the process of U. S. 1,517,049.

Other types of organic colloids could be used as binding agents for these photographic elements in making the herein described elements. Suitable colloids exhibiting high viscosity characteristics and appreciable gel strength which are compatible with these novel dye intermediates include albumin, agar-agar, Irish moss, cellulosic derivatives, synthetic resins such as polyvinyl acetals, etc.

The dye intermediate need not be placed directly in the light-sensitive layer but may be used in separate layers which are in operative association therewith. Thus, they can be incorporated in a separate gelatin or other water-permeable colloid layer which is superimposed on a light-sensitive layer or spaced therefrom by means of thin water-permeable colloid layers. In addition, the immobile compounds of this invention may be incorporated in color-yielding elements of the type set forth in application Ser. No. 370,195 and application Ser. No. 370,194 now U. S. P. 2,328,023, filed December 14, 1940. To be more specific, such high molecular weight dye intermediates can be used in colloid layers in elements free from photo-sensitive strata or containing such strata in a position that they do not coact with the colloid layer.

The compounds of this invention which contain such molecular weight and/or structure that they are rendered immobile in colloid layers of a photographic film are useful in producing colored pictures by the method described in U. S. Patents 1,055,155, 2,178,882, 2,179,228, 2,179,238, 2,179,239, and the process of Woodward U. S. applications Serials Nos. 335,416, filed May 15, 1940, now U. S. P. 2,297,732, 450,403, filed July 10, 1942, and McQueen and Woodward U. S. application Serial No. 299,760, filed October 16, 1939. These compounds may be used in conjunction with various types of reducible silver salt images including those from simple and mixed silver halides such as silver chloride, silver bromide, silver chlorobromide, etc., images, latent images, bleached silver images such as silver ferrocyanide, silver copper chloride, silver chromium chloride, as well as silver chromate and other water-insoluble silver salts. Images produced by the exposure of bichromated gelatin are also reduced by the color-forming developer procedure described above.

Other uses for these products include the preparation of filter and non-halation dyes for photographic film. These intermediates and the dyes produced from them can also be used in the catalytic silver bleach process of color photography as described in U. S. Patent 2,020,775. They can also be used to produce dyes and pigments for paints and for coloring textiles, especially by the process of Kirby application Serial No. 411,261 and Woodward application Serial No. 411,262, filed September 17, 1941.

As many widely different embodiments of this invention may be made without departing from the spirit and scope thereof it is to be understood that the invention is not limited to the specific embodiments thereof except as defined in the appended claims.

I claim:

1. A process of color photography which comprises developing a reducible silver salt image in the presence of a dye intermediate taken from the group consisting of basic N-substituted 1-amino-5-naphthols and basic N-substituted 1-amino-8-naphthols having in the 2-position a group which prevents azo coupling in this position taken from the class consisting of hydrocarbon radicals and hydrocarbon radicals containing an ether linkage and having attached to the said amino groups a methylene group which has connected thereto a radical taken from the class consisting of hydrocarbon radicals and ether interrupted hydrocarbon radicals, said latter radicals containing an immobilizing component taken from the group consisting of amides and esters of polymeric carboxylic acids which are attached to a carbon atom of said radicals through a linkage taken from the group consisting of amides and ester linkages, said naphthols having a molecular weight in excess of 300, with an aromatic primary amino color-developing agent.

2. A color-yielding element for photographic processes comprising a base and a water permeable colloid layer containing a dye intermediate taken from the group consisting of basic N-substituted 1-amino-5-naphthols and basic N-substituted 1-amino-8-naphthols having in the 2-position a group which prevents azo coupling in this position taken from the class consisting of hydrocarbon radicals and hydrocarbon radicals containing an ether linkage and having attached to the said amino groups a methylene group which has connected thereto a radical taken from the class consisting of hydrocarbon radicals and ether interrupted hydrocarbon radicals, said latter radicals containing an immobilizing component taken from the group consisting of amides and esters of polymeric carboxylic acids which are attached to a carbon atom of said radicals through a linkage taken from the group consisting of amides and ester linkages, said naphthols having a molecular weight in excess of 300.

3. A photographic element comprising a base, a light-sensitive silver halide emulsion layer and a water permeable stratum containing a basic substituted 1-amino-5-naphthol having a color unit structure of the following formula:

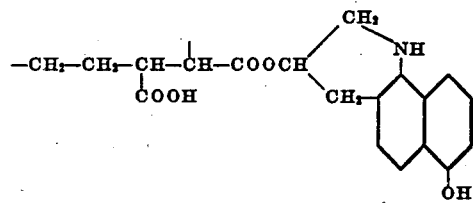

4. A photographic element comprising a base, a light-sensitive silver halide emulsion layer and a water-permeable stratum containing a basic substituted 1-amino-5-naphthol having a color unit structure of the following formula:

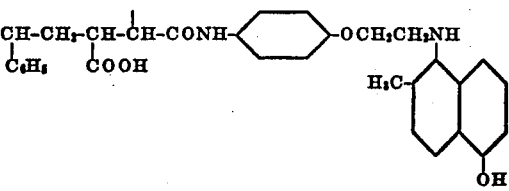

DAVID W. WOODWARD.